O. C. SAMPHERE.
CONNECTING BRACKET FOR DENTAL HANDPIECES.
APPLICATION FILED NOV. 20, 1914.

1,152,122.
Patented Aug. 31, 1915.

Witnesses
J. A. Otto
I. D. Bremer.

Inventor
Orin C. Samphere
By Erwin & Wheeler
Attorneys

UNITED STATES PATENT OFFICE.

ORIN C. SAMPHERE, OF MILWAUKEE, WISCONSIN.

CONNECTING-BRACKET FOR DENTAL HANDPIECES.

1,152,122.  Specification of Letters Patent.  Patented Aug. 31, 1915.

Application filed November 20, 1914. Serial No. 873,093.

*To all whom it may concern:*

Be it known that I, ORIN C. SAMPHERE, a citizen of the United States, residing at Milwaukee, county of Milwaukee, and State of Wisconsin, have invented new and useful Improvements in Connecting-Brackets for Dental Handpieces, of which the following is a specification.

My invention relates to improvements in connecting brackets for guards, moisteners, etc., used as auxiliary attachments for dental hand pieces.

The object of my invention is to provide a form of connecting bracket which will not act as a conveyer to deliver saliva to the spindle bearings. Also to provide a form of bracket which will securely engage the hand piece, but which can be readily detached therefrom when not in use. Also to provide a form of bracket which can be cheaply and simply made from stamped sheet metal.

Figure 1:
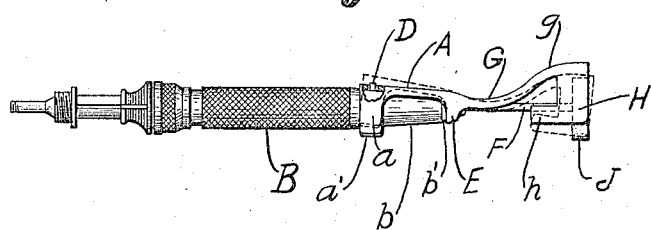
Figure 2:
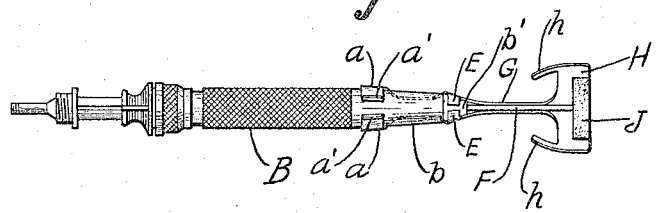

In the drawings—Figure 1 is a side view of a dental hand piece spindle and grinding wheel, showing my bracket in use as a support for a guard, partially inclosing the grinding wheel, with dotted lines indicating the manner in which the bracket is manipulated in order to remove it from the hand piece. Fig. 2 is a view of the same, taken at right angles to that of Fig. 1, and showing the extremities of the clamping arms.

Like parts are identified by the same reference characters in both views.

My improved connecting bracket is formed with a shank A, preferably cylindrically concave on its inner face, and adapted to partially embrace the tapered portion $b$ of the hand piece B. The rear end of the bracket is provided with a set or pair of arms $a$, which partially encircle the rear or inner portion of the tapered member $b$ and are provided with outwardly turned extremities $a'$ forming lips. These arms $a$ extend slightly more than half way around the engaged portion of the member $b$, so that they will not slip off laterally unless pressure is applied to the lips $a'$. The arms have sufficient resilience to permit them to spread under such pressure. When the arms are in normal position of engagement with the member $b$, a projection or stud D on said member enters an aperture formed to receive it in the rear end of the shank A, whereby the shank is locked to the member $b$ by the arm $a$ and the stud D engaging in said aperture. But when pressure is applied to the lips $a'$, the shank is pressed outwardly and retracted from the stud D, after which the shank may be removed by a longitudinal movement. The shank is preferably provided with another set of arms E, which engage the extremity $b'$ of the member B, said extremity being more abruptly tapered. These arms E extend nearly around the extremity $b'$, but are sufficiently separated to allow the spindle F to pass between them.

The bracket shank above described is provided with an outwardly extending neck G, which is curved laterally as shown at $g$, and supports a guard H, which is semi-cylindrical in form and is adapted to partially embrace a grinding wheel, lance, or other dental tool J. This guard is preferably provided with rearwardly extending lips $h$.

The entire device may be made from sheet metal, stamped or struck up into the desired form. It can be very quickly slipped upon the tapered end of the hand piece and manipulated until the shank aperture is directly over the stud D. This rear end of the shank may be then be pressed in the direction of the member B, whereupon the arm $a$ will automatically spread sufficiently to pass partially around the member $b$ and resiliently clamp upon the same. The arms $e$ will of course be in engaging position when this is done, since these arms may be moved longitudinally into and out of such position when the shank is not engaged by the stud D. The stud D serves as the locking member.

It will of course be understood that my improved connecting bracket may be used to support any auxiliary device to be used in connection with a dental tool, such as the guard H, a sponge, or any other device adapted to be connected with the bracket. The guard or tool H is adapted to receive a sponge, the latter being applied to its interior or concave face. The guard H, however, will ordinarily be formed integrally with the bracket proper.

I claim—

1. A connecting bracket for dental hand pieces, including a shank formed to fit the end portion of the hand piece and provided with a plurality of arms partially encircling the same, one pair of said arms being adapted to move resiliently into and out of clamping position upon the hand piece, in combination with a projection adapted to effect an interlocking engagement between the shank and the hand piece, substantially as described.

2. A connecting bracket for dental hand pieces, including the combination of a sheet metal shank provided with a plurality of arms adapted to partially encircle the outer end portion of the hand piece, the rear set of arms being resilient and provided with outwardly turned lips to facilitate spreading such arms, and means for interlocking the shank with the hand piece on the opposite side thereof from that occupied by the lips, substantially as described.

In testimony whereof I affix my signature in the presence of two witnesses.

ORIN C. SAMPHERE.

Witnesses:
LEVERETT C. WHEELER,
IRMA D. BREMER.

Copies of this patent may be obtained for five cents each, by addressing the "Commissioner of Patents, Washington, D. C."